(12) United States Patent
Swintak et al.

(10) Patent No.: US 11,344,899 B2
(45) Date of Patent: May 31, 2022

(54) WEAR-LEVELLING APPARATUS FOR CYCLONES

(71) Applicant: Weir Canada, Inc., Mississauga (CA)

(72) Inventors: Mike Swintak, Georgetown (CA); Mark Schmidt, Bedford (CA); Vladimir Pajic, Kitchener (CA); Richard Haight, Brampton (CA); Ronald Stark, Brampton (CA); Edwin Siu, Richmond Hill (CA)

(73) Assignee: WEIR CANADA, INC.

( * ) Notice: Subject to any disclaimer, the term of this patent is extended or adjusted under 35 U.S.C. 154(b) by 0 days.

(21) Appl. No.: 16/982,465

(22) PCT Filed: Mar. 13, 2019

(86) PCT No.: PCT/IB2019/052035
§ 371 (c)(1),
(2) Date: Sep. 18, 2020

(87) PCT Pub. No.: WO2019/180549
PCT Pub. Date: Sep. 26, 2019

(65) Prior Publication Data
US 2021/0016298 A1      Jan. 21, 2021

Related U.S. Application Data

(60) Provisional application No. 62/646,035, filed on Mar. 21, 2018.

(51) Int. Cl.
*B01D 45/12* (2006.01)
*B04C 5/085* (2006.01)
(Continued)

(52) U.S. Cl.
CPC .............. *B04C 5/085* (2013.01); *B01D 45/12* (2013.01); *B01D 45/16* (2013.01); *B04C 11/00* (2013.01);
(Continued)

(58) Field of Classification Search
CPC .......... B04C 5/085; B04C 11/00; B04C 5/08; B04C 5/04; B04C 5/13; B01D 45/16; B01D 45/12; B05D 2401/32
See application file for complete search history.

(56) References Cited

U.S. PATENT DOCUMENTS 1,393,553 A * 10/1921 Leonhardt ................. B04C 5/13
                                                        55/411
2,534,702 A * 12/1950 Driessen .................... B04C 5/02
                                                        55/460
(Continued)

FOREIGN PATENT DOCUMENTS

AU           722695 B2     8/2000
DE      102008011744 A1    9/2009
(Continued)

*Primary Examiner* — Dung H Bui
(74) *Attorney, Agent, or Firm* — Morriss O'Bryant Compagni Cannon PLLC (57) ABSTRACT

A wear-levelling apparatus (124) for a cyclone (100) includes: an upper section (128) defining an upper portion of a frusto-conical channel configured to receive material for delivery to a lower portion of the channel; a bearing assembly connected to the upper section; and a lower section (132) coupled to the upper section by the bearing assembly to permit rotation of the lower section about an axis of the channel; the lower section defining a lower portion of the channel configured to receive the material from the upper portion for discharge toward an outlet (120) of the cyclone.

15 Claims, 6 Drawing Sheets

(51) Int. Cl.
   *B04C 11/00* (2006.01)
   *B01D 45/16* (2006.01)
   *B04C 5/08* (2006.01)
   *B04C 5/04* (2006.01)
   *B04C 5/13* (2006.01)

(52) U.S. Cl.
   CPC ............... *B04C 5/04* (2013.01); *B04C 5/08* (2013.01); *B04C 5/13* (2013.01); *B05D 2401/32* (2013.01)

(56) References Cited

U.S. PATENT DOCUMENTS

| | | | | | |
|---|---|---|---|---|---|
| 2,974,684 | A * | 3/1961 | Ginaven | ................ | B04B 7/085 285/148.23 |
| 3,087,645 | A * | 4/1963 | Eddy | ................ | B04C 5/081 220/62.17 |
| 4,004,898 | A * | 1/1977 | Kalen | ................ | B04C 5/20 55/434.1 |
| 4,103,539 | A * | 8/1978 | Worley | ................ | B04C 11/00 73/86 |
| 4,872,345 | A * | 10/1989 | Dicks | ................ | G01B 17/02 73/597 |
| 4,956,090 | A * | 9/1990 | Robinson | ................ | B04C 5/08 209/727 |
| 7,293,657 | B1 * | 11/2007 | Kelton | ................ | B04C 5/081 209/715 |
| 9,267,636 | B2 * | 2/2016 | Chamberland | ........ | F16L 9/125 |
| 2005/0069016 | A1 * | 3/2005 | Martin | ................ | F16L 57/06 374/7 |
| 2005/0103691 | A1 * | 5/2005 | Hakola | ................ | B04C 5/13 209/715 |
| 2008/0290008 | A1 * | 11/2008 | Hakola | ................ | B04C 5/14 209/715 |
| 2009/0209403 | A1 * | 8/2009 | Conrad | ................ | A47L 9/1658 494/63 |
| 2013/0031883 | A1 * | 2/2013 | Werchowski | ............ | B04C 5/13 55/459.1 |
| 2013/0134108 | A1 * | 5/2013 | Howard | ............ | B01D 17/0217 210/788 |
| 2013/0269301 | A1 * | 10/2013 | Stroeder | ................ | B01D 45/16 55/434.2 |
| 2014/0205429 | A1 * | 7/2014 | Harwell | ................ | B04C 5/085 415/1 |
| 2014/0216333 | A1 * | 8/2014 | Hoversten | ................ | B04C 3/06 118/308 |
| 2016/0184837 | A1 * | 6/2016 | Trench | ................ | B01D 45/12 55/461 |
| 2018/0044107 | A1 * | 2/2018 | Mino | ................ | B65D 88/26 |
| 2020/0094211 | A1 * | 3/2020 | Panchal | ................ | B01J 8/0055 |
| 2020/0307541 | A1 * | 10/2020 | Michels | ................ | B60T 13/662 |

FOREIGN PATENT DOCUMENTS

JP    08326645 A  * 12/1996
RU    2234985 C1     8/2004

* cited by examiner

WEAR-LEVELLING APPARATUS FOR CYCLONES

The specification relates generally to cyclonic separation of materials, and specifically to a wear-levelling assembly apparatus for cyclones.

Cyclones are used to separate heterogeneous feed material into components by density, particle size, or both. For example, in oilsands operations, cyclones can be employed to recover bitumen from feed material that also includes debris in the form of rocks, vegetation and the like, as well as solvents such as water and naphtha. The feed material is injected under pressure at a feed inlet near a base (i.e. wide end) of a frusto-conical channel. Bitumen-laden sand and other small and/or lightweight components of the feed material, such as naphtha, are ejected via an overflow outlet, typically defined at the base of the channel. The remaining heavier materials, including the above mentioned vegetation, debris and the like, travel along the channel and are ejected from an underflow outlet defined at the apex (i.e. narrow end) of the channel. The underflow material can impose substantial wear on the inner wall of the channel. Wear on the inner wall typically increases in severity towards the underflow outlet, and periodically necessitates replacement of at least a portion of the cyclone.

An aspect of the specification provides a wear-levelling apparatus for a cyclone, comprising: an upper section defining an upper portion of a frusto-conical channel configured to receive material for delivery to a lower portion of the channel; a bearing assembly connected to the upper section; and a lower section coupled to the upper section by the bearing assembly to permit rotation of the lower section about an axis of the channel; the lower section defining a lower portion of the channel configured to receive the material from the upper portion for discharge toward an outlet of the cyclone.

Another aspect of the specification provides a wear-levelling apparatus for a cyclone, the wear-levelling apparatus comprising: an upper section defining an upper portion of a separation chamber configured to receive material for delivery to a lower portion of the separation chamber; a bearing assembly connected to the upper section; and a lower section coupled to the upper section by the bearing assembly to permit rotation of the lower section about an axis of the separation chamber; the lower section defining a lower portion of the separation chamber configured to receive the material from the upper portion for discharge toward an outlet of the cyclone.

The upper section of the separation chamber may be frusto-conical in shape, tapered, partly tapered and partly parallel, or any other convenient shape.

Yet another aspect of the specification provides a wear-levelling apparatus for a cyclone, comprising: an upper section defining an upper portion of a separation chamber configured to receive material for delivery to a lower portion of the separation chamber; a bearing assembly connected to the upper section; and a lower section coupled to the upper section by the bearing assembly to permit relative rotation of one or both of the upper and lower sections about an axis of the separation chamber; the lower section defining a lower portion of the separation chamber configured to receive the material from the upper portion for discharge toward an outlet of the cyclone.

In some embodiments, the upper section may rotate while the lower section remains fixed; in other embodiments, the upper section may remain fixed while the lower section rotates; in yet other embodiments both upper and lower sections may rotate (at the same time or at different times) to reduce wear on each section.

Another aspect of the specification provides a cyclone comprising: a wear levelling apparatus according to any of the above aspects and a control unit operable to control the rotation of the upper and/or lower sections. An actuator, such as a motor, may be provided to perform the rotation in response to a command from the control unit.

The cyclone may comprise a replaceable liner mounted on an internal wall of the cyclone channel (or separation chamber), and the replaceable liner may include one or more sensors mounted in or near the replaceable liner that detect a thickness of the replaceable liner. The sensors may include ultrasonic sensors.

The control unit may be operable to rotate the upper and/or lower section until the detected thickness of the replaceable liner at a point adjacent to the sensor(s) exceeds a minimum thickness. In the event that no part of the replaceable liner at a point adjacent to the sensor(s) exceeds a minimum thickness the control unit may transmit a service signal to a remote interface. The remote interface may comprise a central control system that receives input from, and provides outputs to, various items of equipment on a site, for example, mining equipment on a mine site. Alternatively, or additionally, the remote interface may comprise a portable monitoring device, such as a cellular radiofrequency telephone carried by service personnel.

Yet another aspect of the specification provides a method of operating a cyclone to reduce wear thereon, the method comprising: (i) sensing a thickness of a section of the cyclone; and (ii) rotating that section of the cyclone relative to another section of the cyclone using an actuator.

The step of sensing a thickness of a section of the cyclone may comprise sensing the thickness of a wall of the section, where the wall comprises an external metal part and an internal liner mounted on the metal part. The internal liner may comprise a replaceable liner.

Rotating one section of the cyclone relative to another section of the cyclone using an actuator optionally includes sensing a thickness of the replaceable liner as the actuator rotates the section, and continuing to rotate the section until a sensed thickness exceeds a predetermined threshold.

The method optionally further comprises conveying a service signal to a remote interface. This may occur when the section is rotated by a complete turn and no part thereof has a thickness exceeding the predetermined threshold, and/or when a liner thickness is reduced to a predetermined value. Conveying a service signal to a remote interface has the advantage that thickness detection can be used to advise the owner or operator of the hydrocyclone that a liner has a certain thickness, which, in turn, may be used as a trigger for maintenance of the hydrocyclone.

Embodiments, which are given by way of example only, are described with reference to the following figures, in which.

Figure 1:
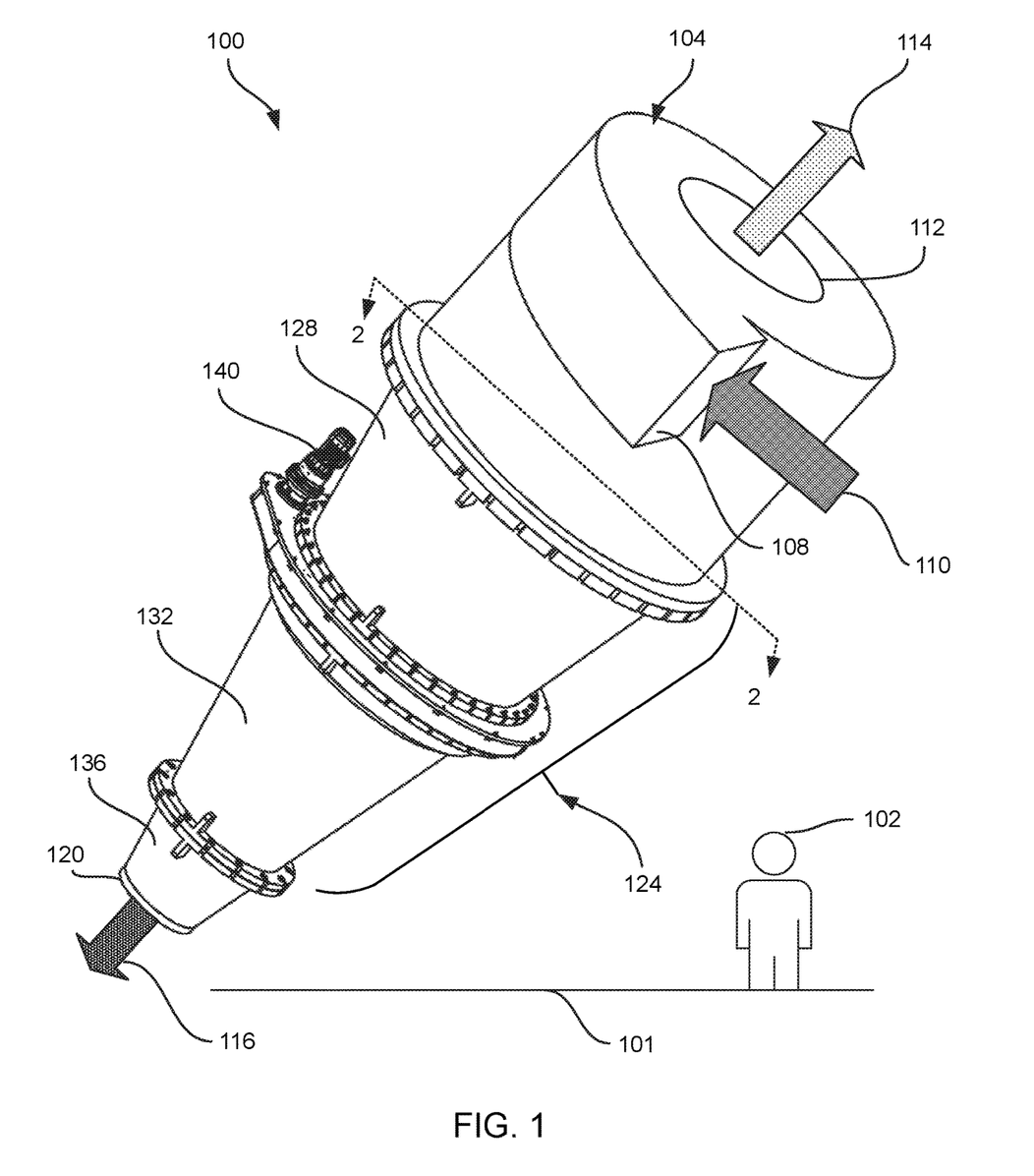
FIG. 1 depicts a cyclone.

FIG. 1 depicts a cyclone 100, shown in an example operational position, at an inclination of about 45 degrees relative to a substantially horizontal support surface 101 (e.g. a facility floor or the like, on which an operator 102 is shown). In other embodiments, the cyclone 100 may be mounted vertically, or at any suitable angle between that shown and a vertical orientation. In further embodiments, the cyclone 100 may be mounted at an angle smaller than 45 degrees (i.e. closer to horizontal than shown in FIG. 1).

The cyclone 100 includes a body 104 including an inlet 108 for receiving feed material 110, and an overflow outlet 112 for discharging an overflow component 114 of the feed material 110. The body 104 is substantially cylindrical in the illustrated embodiment, however in other embodiments the body 104 can be frusto-conical, for example with a base defining the overflow outlet 114 and an apex connecting the body 104 with further elements of the cyclone 100, discussed below. In other embodiments, the body 104 may define a tapered internal surface, or a part tapered, part parallel, internal surface.

While the overflow component 114 of the feed material 110 is discharged at the overflow outlet 112, the remainder of the feed material 110, referred to as an underflow component 116, travels in a vortex within the cyclone 100 toward an underflow outlet 120. The cyclone 100 can be deployed in a wide variety of applications, including mining and mineral processing applications (e.g. oil and gas operations, diamond, coal and the like). The nature of the feed material 110, overflow component 114 and underflow component 116 are therefore not particularly limited. In some examples, the cyclone 100 may be deployed in an oilsands processing facility. In such examples, the feed material 110 includes the output stream of a separator (not shown) in which raw material from mining operations is mixed with water and other solvents (e.g. naphtha). A portion of the oil-bearing material is removed at the separator stage, but the remaining material from the separator contains, in addition to various debris (rocks, vegetation and the like), oil-bearing materials such as bitumen-laden sand. The cyclone 100 is employed in such processes to recover at least a portion of the above-mentioned bitumen.

Between the body 104 and the underflow outlet 120 are a plurality of sections defining a frusto-conical channel within the cyclone 100. The plurality of sections include at least a pair of sections defining a wear-levelling assembly or apparatus 124. In particular, the wear-levelling assembly 124 includes an upper section 128 and a lower section 132, as well as a bearing assembly (not shown) movably connecting the lower section 132 to the upper section 128. In the illustrated embodiment, an additional apex section 136 is also included, fixed to the lower section 132. The apex section 136 defines the underflow outlet 120.

As will be discussed in greater detail below, the lower section 132 (and by extension the apex section 136) is configured, via the bearing assembly, to rotate relative to the upper section 128. Rotation of the lower section 132 can be performed manually, or driven by an actuator such as a motor 140 (e.g. when the size of the cyclone 100 is such that manual rotation is not feasible, when the cyclone 100 is not readily accessible during operation, when the cyclone 100 is to be rotated by a remote operator, and the like). Rotation of the lower section 132 and the apex section 136 exposes the inner walls of the sections 132 and 136 to more even wear than in the absence of such rotation. For example, in the inclined orientation shown in FIG. 1, due to gravity the underflow material 116 tends to impose greater wear on portions of the inner walls of the sections 132 and 136 that are positioned at the underside of the cyclone 100 (i.e. closer to the support surface 101). By rotating the sections 132 and 136, different portions of the inner walls are exposed to such increased wear over time, thus levelling the wear over the entirety of the inner walls and extending the operational lifetime of the sections 132 and 136.

Figure 2:
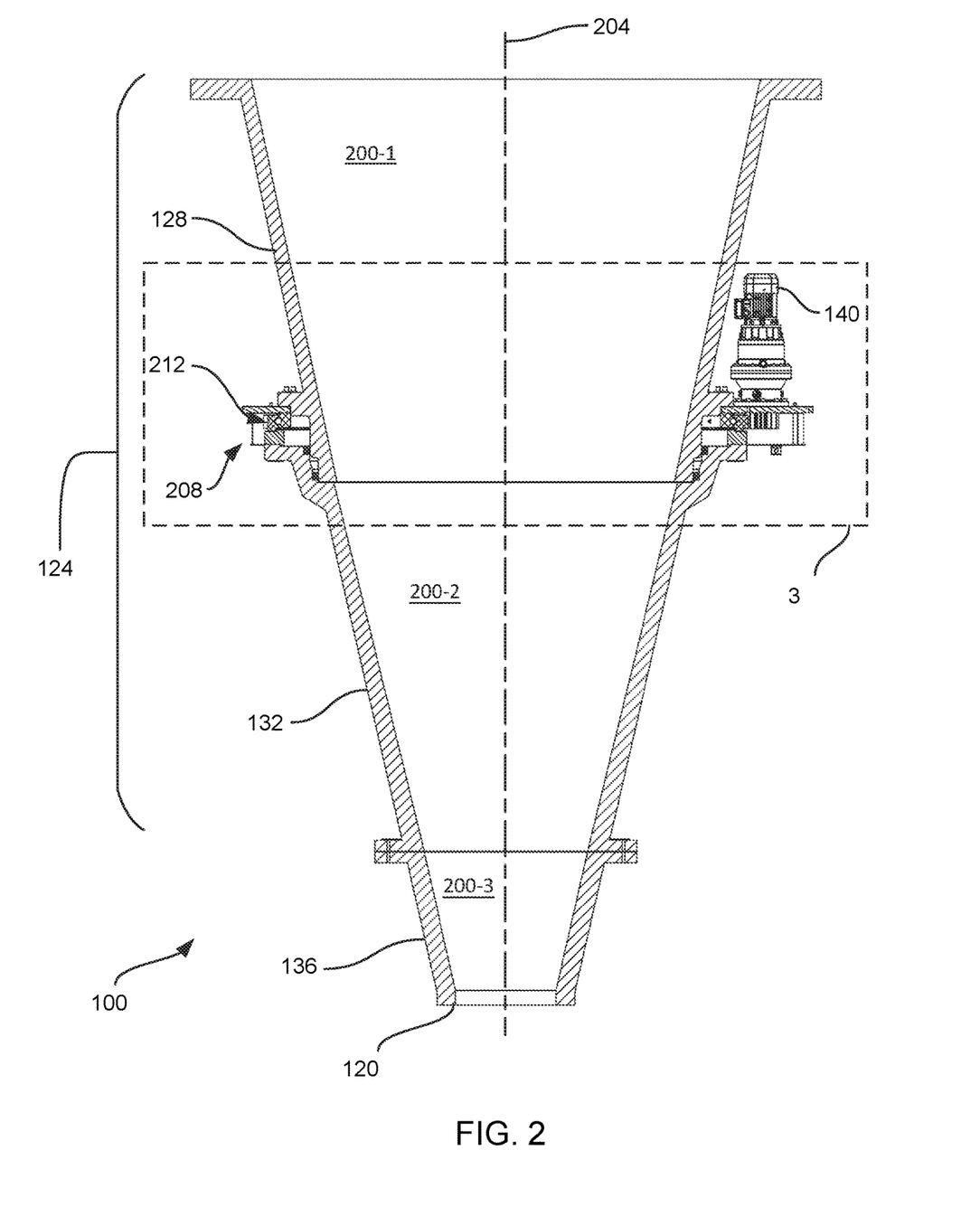
FIG. 2 is a cross sectional elevation of a portion of the cyclone of FIG. 1.

Turning to FIG. 2, a cross section of the cyclone 100 taken as indicated at 2-2 in FIG. 1 and omitting the body 104, is illustrated. As seen in FIG. 2, the sections 128, 132 and 136 define a frusto-conical channel 200 (also referred to as a separation chamber) having an axis 204. The channel 200 is divided into first, second and third portions 200-1, 200-2 and 200-3, respectively. As will now be apparent, the upper section 128 defines an upper portion 200-1 of the channel 200, the lower section 132 defines a lower portion of the channel 200, and the apex section 136 defines an outlet or discharge section 200-3 of the channel 200.

Also illustrated in FIG. 2 is the bearing assembly 208 referred to above. As will be described in greater detail in connection with FIG. 3, the bearing assembly 208 includes a bearing (e.g. a slew bearing) 212 that movably connects the lower section 132 to the upper section 128, and permits the lower section 132 to rotate about the axis 204 relative to the upper section 128. The rotation of the lower section 132, in the present example, is driven by the motor 140.

Figure 3:
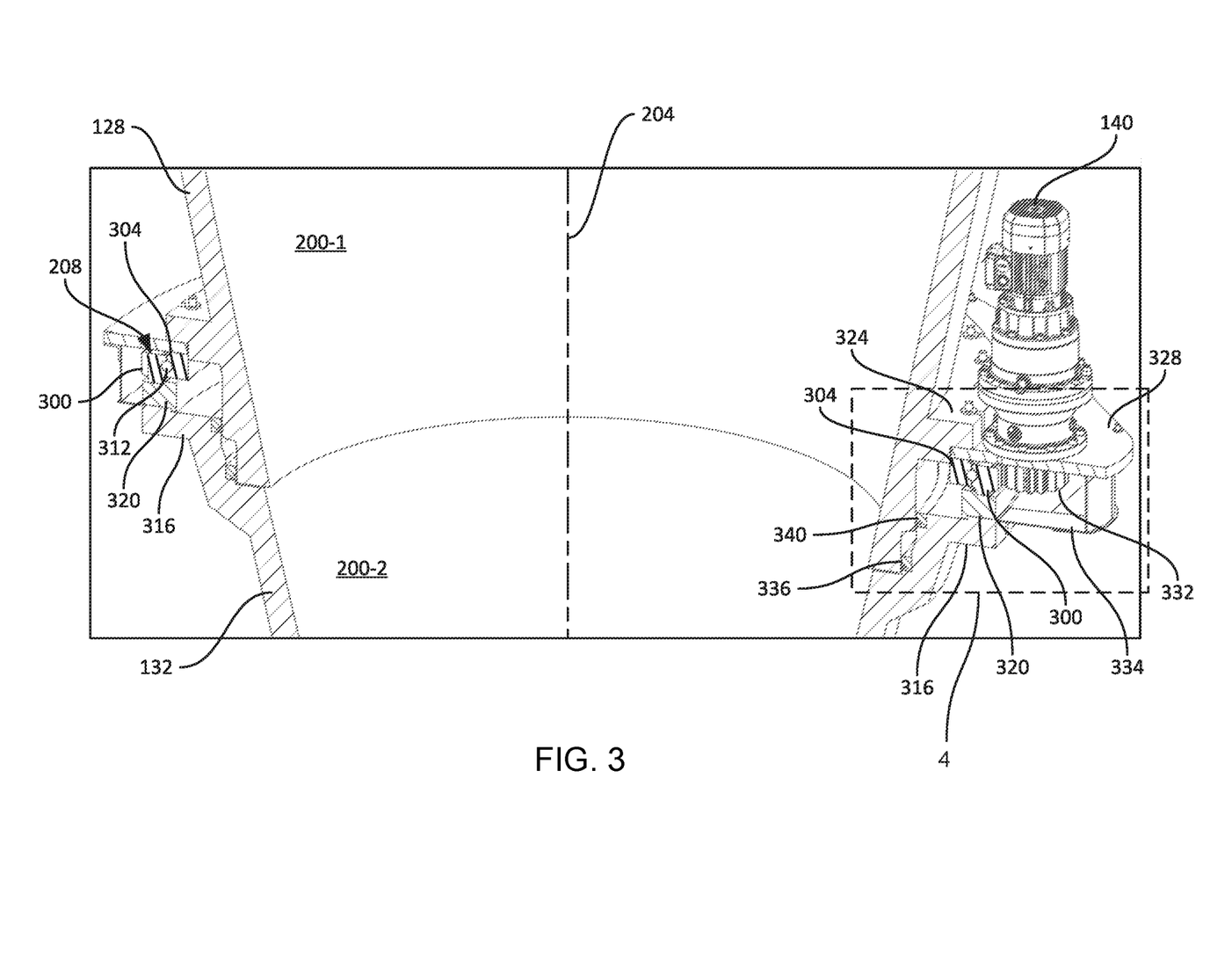
FIG. 3 is a detailed view of a portion of the cross section of FIG. 2, shown in perspective.

Referring to FIG. 3, a detailed view of the portion of the cyclone 100 indicated as box 3 in FIG. 2 is illustrated. As seen in FIG. 3, the bearing assembly 208 includes a lower race 300 fixed to the lower section 132, as well as an upper race 304 fixed to the upper section 128. The lower and upper races 300 and 304 may also, in the arrangement shown in FIG. 3, be referred to respectively as outer and inner races, as the lower race 300 is located further from the axis 204 than the upper race 304. One or more rolling elements (e.g. a set of roller bearings) 312 housed between the races 300 and 304 permit the races 300 and 304 to move relative to one another.

The lower race 300 is fixed to a flange 316 of the lower section 132 in the present embodiment, for example by bolts or other fasteners extending through the flange 316 and a spacer or ring 320. The upper race 304, meanwhile, is fixed to a flange 324 of the upper section 128. In particular, in the present embodiment the upper race 304 is connected to the flange 324 by bolts or other fasteners extending through the flange 324 and through a mounting plate 328. As will be apparent, any of a variety of fasteners is suitable for connecting the races 300 and 304 to the sections 132 and 128. Preferably the fasteners are removable (e.g. to permit removal and maintenance, and to permit replacement of the sections 128 and 132 while re-using the bearing assembly 208). In some embodiments, however, the fasteners may be permanent, such as welds or the like.

The mounting plate 328, in addition to providing an interface between the flange 324 and the upper race 304, supports the motor 140 in a fixed relationship relative to the upper section 128. In other embodiments, the motor 140 can be fixed to the lower section 132 rather than the upper section 128, however in such embodiments supplying power to the motor 140 may be complicated due to the movement of the motor 140.

The motor 140 includes an output pinion 332 driven by a shaft (not shown) extending through the mounting plate 328. The pinion 332 engages a set of teeth formed on the outer wall of the lower race 300, permitting the motor 140 to drive rotation of the lower race 300 relative to the upper race 304 (and therefore driving rotation of the lower section 132 relative to the upper section 128). In the present example, the motor 140 is electrically powered. In other examples, hydraulic or other motor types can also be employed. The motor 140 can operate continuously to rotate the lower section 132 and the apex section 136 at a constant rate. In other embodiments, the motor 140 can be controlled to rotate the lower section 132 and the apex section 136 through a predetermined arc at suitable intervals. For example, the motor 140 can be operated every four hours to rotate the lower section 132 and the apex section 136 through an arc of about thirty degrees, such that the lower section 132 and the apex section 136 complete a full rotation every 48 hours. Various other suitable rotation schedules will also occur to those skilled in the art, for example to adapt the operation of the cyclone 100 to the material being processed. Of particular note, the cyclone 100 need not be taken offline to perform the above-mentioned rotations. That is, the wear-levelling apparatus 124 permits continued operation of the cyclone 100 during rotation of the lower section 132. In some embodiments, the motor 140 may comprise a stepper motor. The motor 140 may be controlled by a wear sensing unit that monitors wear in the wear levelling assembly 124 (for example using in situ ultrasonic sensors to detect a thickness of a lining forming an inside surface of the wear levelling assembly 124. This has advantages where part of the lining has been damaged or eroded significantly more at one circumferential point of the lining than at other points of the lining at the same circumferential region. This is because the motor 140 can advance rotation beyond the more heavily worn points to ensure that wear of the lining is equalised.

The cyclone 100 can include a guard housing 334 that, together with the mounting plate 328, encloses the pinion 332 and the teeth of the lower race 300 to prevent entry of debris into the bearing assembly 208 and for safety. In other embodiments, the guard housing 334 can be omitted.

The cyclone 100 can also include one or more seals between the upper and lower sections 128 and 132. In the present embodiment, as shown in FIG. 3, a primary seal 336 and a secondary seal 340 are provided. The seals are, for example, annular seals fixed around the circumference of an inner wall of the lower section 132. In other embodiments either or both of the seals 336 and 340 can be fixed to the upper section 128 rather than the lower section 132. As will now be apparent, the secondary seal 340 serves to inhibit the passage of fluid that traverses the primary seal 336. The lower section 132 can include one or more weeping holes (not shown; e.g. a set of four to eight weeping holes distributed around the circumference of the lower section 132) extending through the wall of the lower section 132 between the seals 336 and 340. The weeping holes permit fluid that has traversed the primary seal 336 to escape the lower section 132 and indicate to operators of the cyclone 100 that maintenance of the primary seal 336 may be required.

Although the placement of the motor 140 need not be as shown in FIG. 1, it may be preferable to place the motor 140 as shown in FIG. 1, at the upper side (i.e. further from the support surface 101) of the cyclone 100, to reduce the likelihood of leaked process fluid from pooling near the motor 140 or pinion 332.

Figure 4:
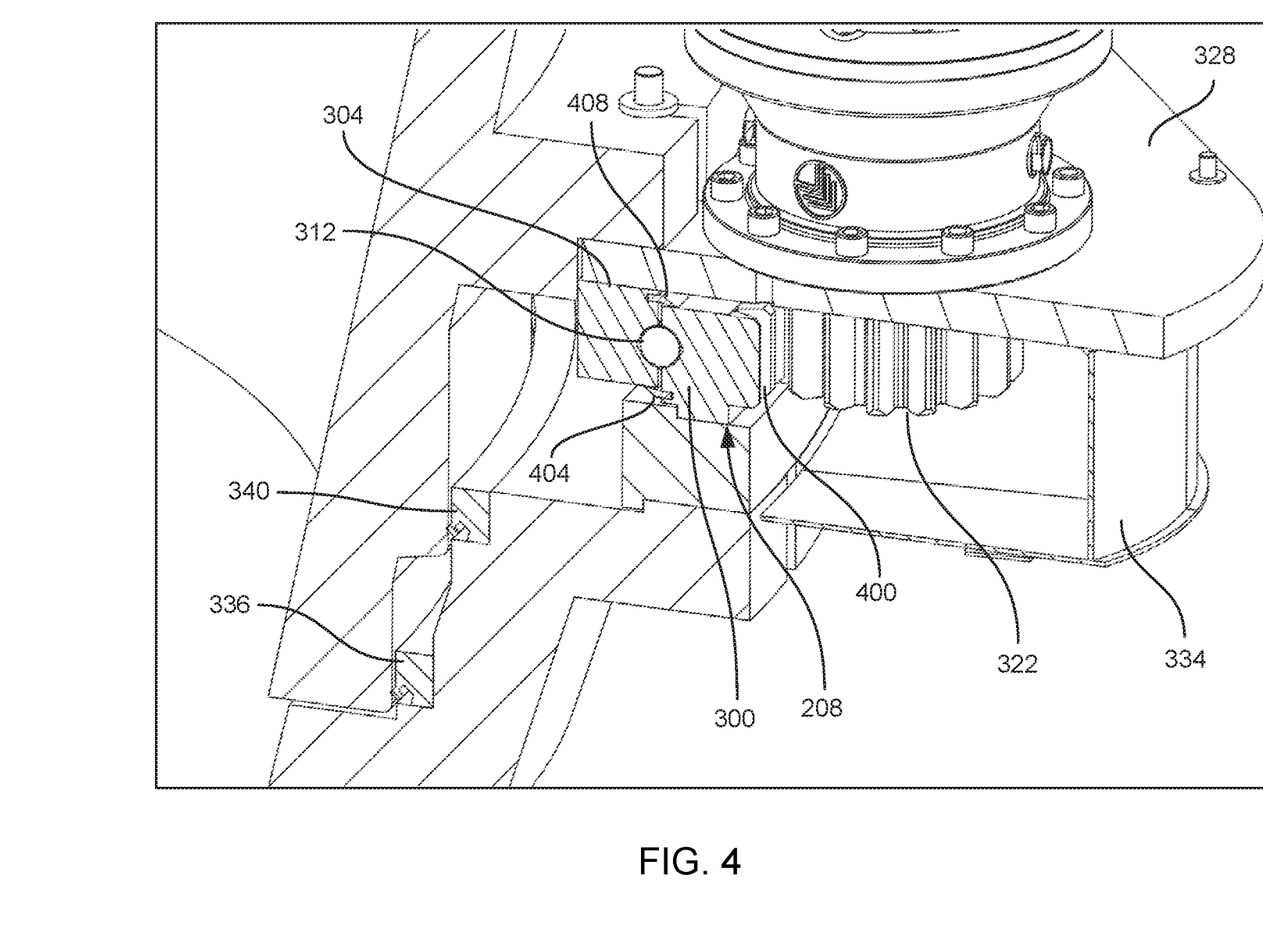
FIG. 4 is a detailed view of a portion of the view of FIG. 3.

FIG. 4 provides a further detailed view of the portion of the apparatus 124 indicated by the box 3 in FIG. 3. In particular, the bearing assembly 208 is shown in greater detail in FIG. 4, such that the above-mentioned teeth 400 are visible, as well as one or more seals serving to retain lubricant between the races 300 and 304 and prevent entry of debris and process fluid into the rolling elements 312. In the present example, a first seal 404 is fixed to the lower race 300 and contacts the upper race 304, while a second seal 408 is fixed to the upper race 304 and contacts the lower race 300. As will be apparent to those skilled in the art, other seal arrangements may also be implemented in connection with the bearing assembly 208.

Variations to the cyclone 100 and apparatus 124 as described above are contemplated. For example, in other embodiments the upper section 128 can be omitted, with the bearing assembly and the lower section 132 being connected directly to the body 104. In further embodiments, a greater number of sections that shown in FIGS. 1 and 2 may be employed, dependent on the operational parameters of the cyclone 100.

Figure 5:
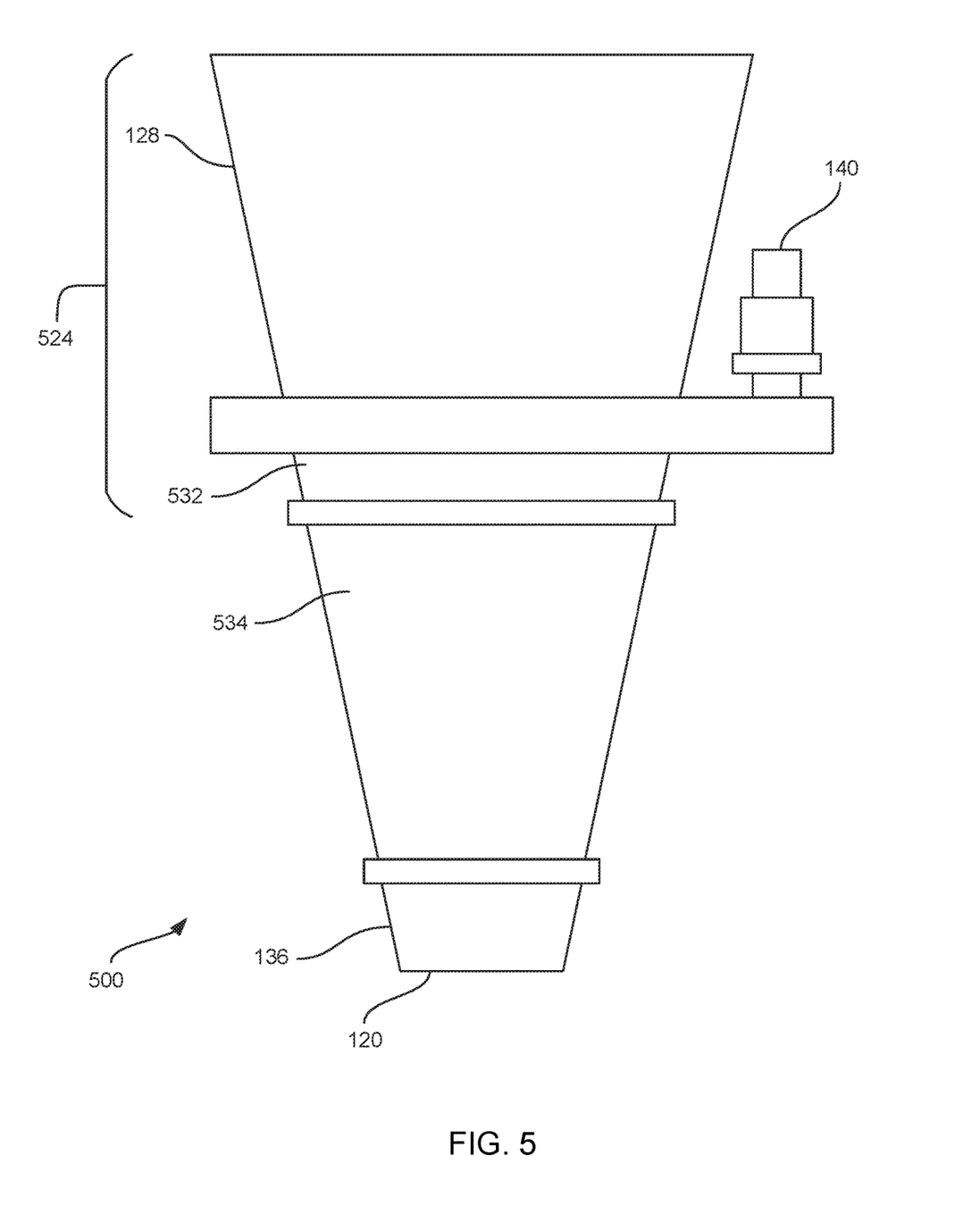
FIG. 5 depicts a cyclone according to another embodiment.

A further embodiment is illustrated in FIG. 5, which depicts a cyclone 500 (omitting the body 104). The cyclone 500 includes certain components as described above, such as the upper section 128, the apex section 136 and the motor 140. However, the cyclone 500 includes a wear-levelling apparatus 524 that includes the upper section 128, a bearing assembly and related components (which are as described earlier herein), and an intermediate section 532 rather than the lower section 132. More specifically, rather than a single lower section 132 between the upper section 128 and the apex section 136, the cyclone 500 includes the intermediate section 532 and a lower section 534 connected thereto. The lower section 534 may be simply fixed to the intermediate section 532 (e.g. via bolts or other removable fasteners, not shown). In the embodiment shown in FIG. 5, replacement of the lower section 534 and the apex section 136 may be effected without requiring the bearing assembly 208 and associated components to be disassembled. The reduced length of the intermediate section 532, as well as the position of the intermediate section 532 further from the underflow outlet 120 (where material velocity and therefore wear are typically greatest) subjects the intermediate section 532 to reduced wear in comparison to the lower section 534 and the apex section 136. The intermediate section 532 therefore may require less frequent replacement than either or both of the lower section 534 and the apex section 136.

Figure 6:
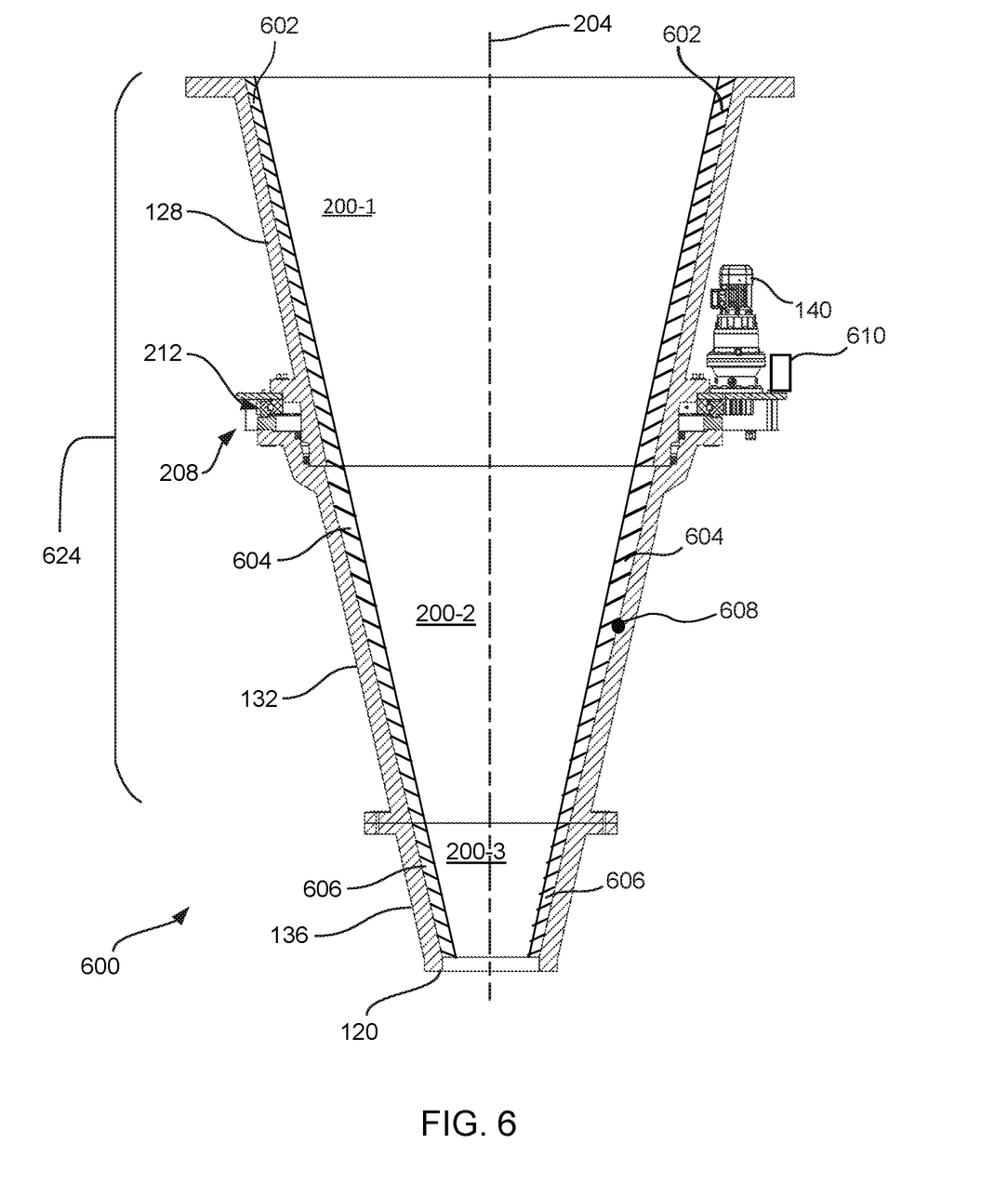
FIG. 6 is a cross sectional elevation of a portion of a cyclone according to yet another embodiment.

A further embodiment is illustrated in FIG. 6, which depicts a simplified, cross-sectional elevation view of a cyclone 600 (taken along a line similar to that indicated at 2-2 in FIG. 1 and omitting the body 104). The cyclone 600 includes certain components as described above, such as the upper section 128, the apex section 136 and the motor 140. However, the cyclone 600 includes a wear-levelling apparatus 624 that includes the upper section 128, a bearing assembly and related components (which are as described earlier herein), an upper section replaceable liner 602 mounted on an inner surface of the upper section 128, and a lower section replaceable liner 604 mounted on an inner surface of the lower section 132, and an apex replaceable liner 606 mounted on an inner surface of the apex section 136.

The replaceable liners 602, 604, 606 may comprise an elastomer liner, a ceramic liner, or a liner comprising any other convenient material or composite of materials, depending on the application of the cyclone 600.

In addition, lower section 132 includes a sensor 608 mounted in an inner wall recess thereof. In this embodiment, the sensor 608 comprises an ultrasonic sensor. The sensor is coupled (via a cable or wirelessly) to a control unit 610 operable to control the operation of the motor 140 in response to a signal from the sensor 608. The control unit 610 may be calibrated to rotate the lower section 132 until the replaceable liner 604 has a thickness exceeding a predetermined value. When no part of the replaceable liner 604 has a thickness exceeding the predetermined value, the control unit 610 may convey a service signal (also referred to as a liner replacement due signal) to a central control system (not shown) that receives input from, and provides outputs to, various items of equipment on a site, for example, mining equipment on a mine site.

In other embodiments, a different sensing system may be used than that described above. For example, the sensors may be mounted on an external sidewall of the lower section 132 rather than an inner wall thereof. In other embodiments, additional sensors may be used on the lower section 132, and sensors may also be used on the upper section 128 and/or the apex section 136. The scope of the claims should not be limited by the embodiments set forth in the above examples, but should be given the broadest interpretation consistent with the description as a whole.

The invention claimed is:

1. A wear-levelling apparatus, comprising:
    an upper section defining an upper portion of a frusto-conical channel of a cyclone configured to receive material for delivery to a lower portion of the channel of the cyclone, the upper section having an axis;
    a bearing assembly connected to the upper section; and
    a lower section of a cyclone coupled to the upper section by the bearing assembly to permit rotation of the lower section about the axis of the upper section, the lower section defining a lower portion of the channel of the cyclone configured to receive the material from the upper portion for discharge toward an outlet of the cyclone.

2. The wear-levelling apparatus of claim 1, wherein the bearing assembly comprises:
    an upper race fixed to the upper section;
    a lower race fixed to the lower section; and
    one or more rolling elements between the upper race and the lower race.

3. The wear-levelling apparatus of claim 2, further comprising: an actuator configured to drive rotation of the lower section.

4. The wear-levelling apparatus of claim 3, wherein the actuator is a motor comprising an output pinion configured to engage the bearing assembly.

5. The wear-levelling apparatus of claim 4, wherein the bearing assembly includes a lower race fixed to the lower section and having a plurality of teeth configured for engagement with the output pinion.

6. The wear-levelling apparatus of claim 4, further comprising a mounting plate fixed to the upper section for supporting the motor.

7. The wear-levelling apparatus of claim 1, further comprising a guard housing enclosing the bearing assembly.

8. The wear-levelling apparatus of claim 1, wherein the lower section includes (i) a replaceable liner mounted on an internal wall thereof, and (ii) one or more sensors mounted in or near the replaceable liner that detect a thickness of the replaceable liner.

9. The wear-levelling apparatus of claim 8, wherein the one or more sensors comprise an ultrasonic sensor.

10. The wear-levelling apparatus of claim 8, further comprising a control unit operable to rotate the upper and/or lower section in response to a signal from the one or more sensors until the detected thickness of the replaceable liner at a point adjacent to the one or more sensors exceeds a minimum thickness.

11. The wear-levelling apparatus of claim 10, wherein the control unit is operable to convey a service signal to a remote interface.

12. A cyclone comprising the wear-levelling apparatus of claim 1 and a control unit operable to control the rotation of the upper and/or lower sections of the wear-levelling apparatus.

13. A method of operating a cyclone to reduce wear thereon, the method comprising:
    (i) providing a cyclone;
    (ii) sensing a thickness of a section of the cyclone; and
    (iii) rotating that section of the cyclone relative to another section of the cyclone about a common axis of the rotating section of the cyclone and another section of the cyclone using an actuator.

14. The method of claim 13, wherein rotating one section of the cyclone relative to another section of the cyclone using an actuator includes sensing a thickness of a replaceable liner mounted on an inner surface of the section as the actuator rotates the section, and continuing to rotate the section until a sensed thickness exceeds a predetermined threshold.

15. The method of claim 14, further comprising conveying a service signal to a remote interface when the section is rotated by a complete turn and no part thereof has a sensed thickness exceeding the predetermined threshold.

* * * * *